United States Patent [19]

Terada et al.

[11] Patent Number: 5,629,034
[45] Date of Patent: May 13, 1997

[54] APPARATUS FOR MOLDING FIBROUS MATERIAL MAINLY CONTAINING WASTE PAPER AND AGRICULTURAL MATERIAL

[75] Inventors: Mitsuo Terada, Takasago; Tetsuro Matsumoto; Kiyofumi Hashimoto, both of Kobe, all of Japan

[73] Assignee: Kabushiki Kaisha Kobe Seiko Sho, Kobe, Japan

[21] Appl. No.: 355,961

[22] Filed: Dec. 14, 1994

[30] Foreign Application Priority Data

| Dec. 14, 1993 | [JP] | Japan | 5-313826 |
| Dec. 14, 1993 | [JP] | Japan | 5-313827 |
| Dec. 28, 1993 | [JP] | Japan | 5-338699 |
| Dec. 28, 1993 | [JP] | Japan | 5-338700 |
| Dec. 28, 1993 | [JP] | Japan | 5-338701 |
| Feb. 28, 1994 | [JP] | Japan | 6-030358 |

[51] Int. Cl.[6] .................................. B29C 47/00
[52] U.S. Cl. ............... 425/382 R; 425/202; 425/208; 425/209; 425/186; 425/464
[58] Field of Search ................... 425/202, 208, 425/209, 186, 382 R, DIG. 230, 464

[56] References Cited

U.S. PATENT DOCUMENTS

| 4,077,754 | 3/1978 | Borcher et al. | 425/205 |
| 4,088,433 | 5/1978 | Simpson | 425/464 |
| 4,408,725 | 10/1983 | Wenger et al. | 425/202 |
| 5,125,824 | 6/1992 | Schaarschmidt | 425/208 |

FOREIGN PATENT DOCUMENTS

| 31289/49 | 2/1950 | Australia . |
| 267801 | 9/1964 | Australia . |
| 290721 | 10/1965 | Australia . |
| 565606 | 10/1985 | Australia . |
| 0239858 | 10/1987 | European Pat. Off. . |
| 0293269 | 11/1988 | European Pat. Off. . |
| 0408964 | 1/1991 | European Pat. Off. . |
| 0451349 | 10/1991 | European Pat. Off. . |
| 274916 | 7/1927 | United Kingdom . |
| 638992 | 6/1950 | United Kingdom . |
| 2171638 | 9/1986 | United Kingdom . |
| WO88/08466 | 11/1988 | WIPO . |

*Primary Examiner*—Robert J. Warden
*Assistant Examiner*—Hien Tran
*Attorney, Agent, or Firm*—Oblon, Spivak, McClelland, Maier & Neustadt, P.C.

[57] ABSTRACT

Disclosed is an apparatus for molding a fibrous material mainly containing waste paper, in which a fibrous material mainly containing waste paper is thrown into a cylindrical cylinder from a raw material throwing port, being fed to the leading edge of the cylindrical casing by the feeding action of a rotary screw provided in the cylindrical casing, and discharged from the leading edge, the apparatus comprising: a molding/discharging member provided at the leading edge of the cylindrical casing for compressing the fibrous material fed to the leading edge of the casing into a specified shape and discharging the compressed fibrous material.

10 Claims, 9 Drawing Sheets

FIG. IA
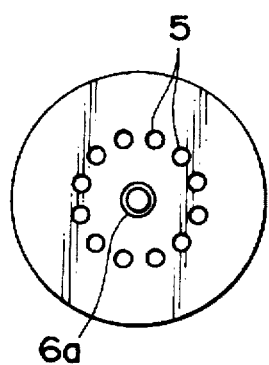
FIG. IB
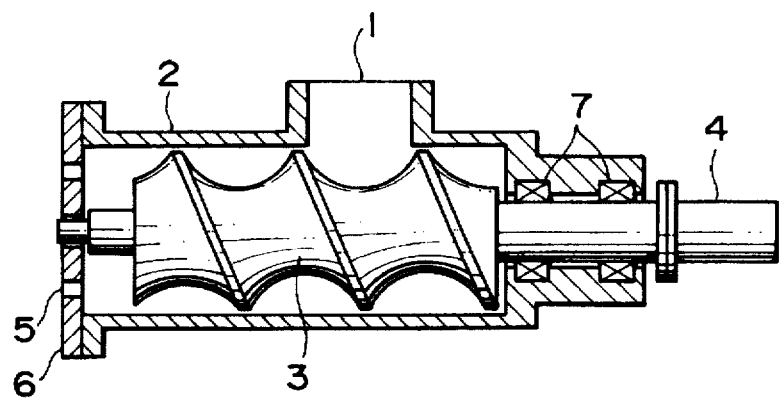
FIG. 2A
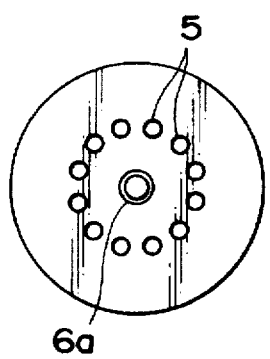
FIG. 2B
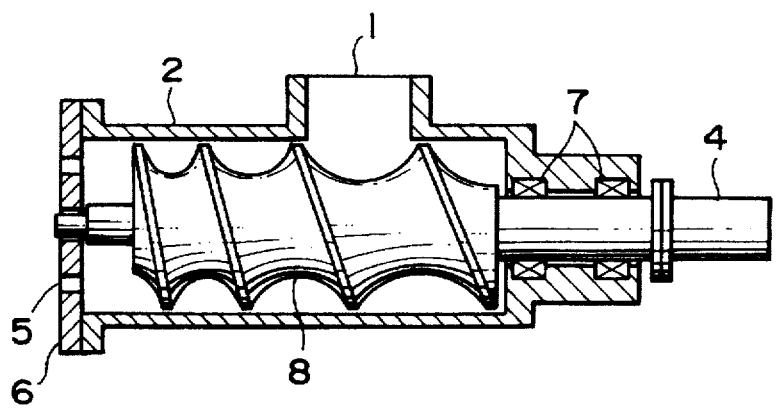

ROTATIONAL
DIRECTION OF SCREW

FIG. 12A
FIG. 12B
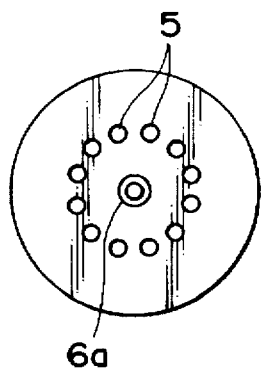
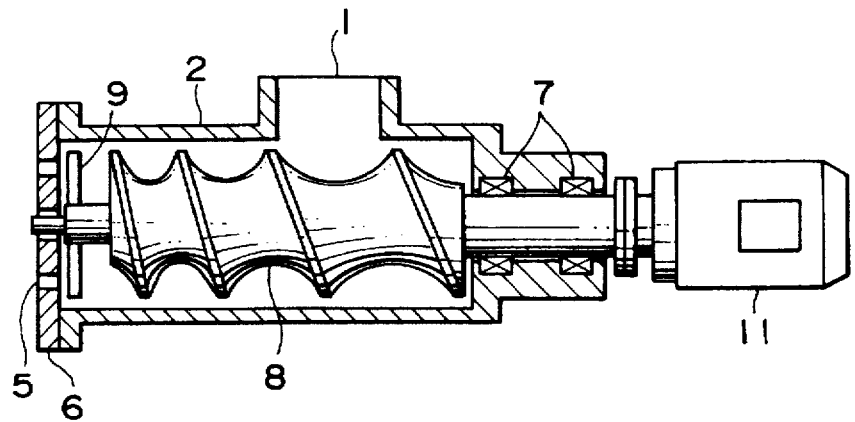
FIG. 13A
FIG. 13B
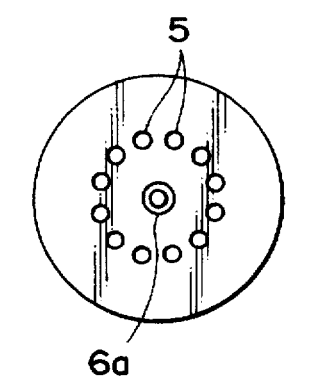
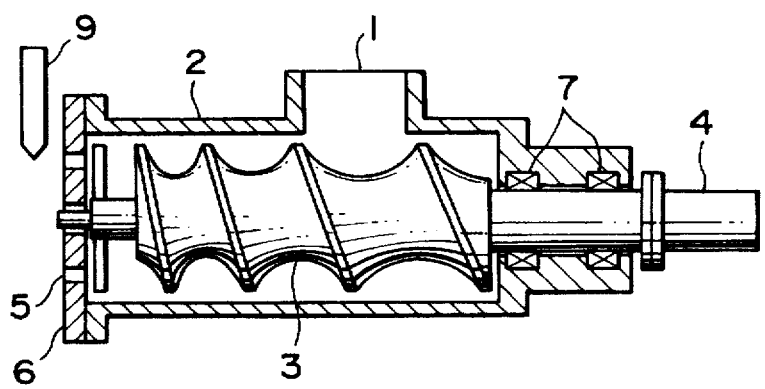

APPARATUS FOR MOLDING FIBROUS MATERIAL MAINLY CONTAINING WASTE PAPER AND AGRICULTURAL MATERIAL

BACKGROUND OF THE INVENTION

1. Field of the Invention

The present invention relates to a molding apparatus for molding a fibrous material mainly containing waste paper in a desirable extruded shape, which is widely usable for fabricating agricultural materials, for example, an agricultural fertilizer such as compost, a manure absorbing/holding material, a seedbed material, and a growing land material for growing crops such as a seedling material for cultivating mushrooms.

2. Description of the Related Art

In recent years, waste paper has been frequently re-used for resource preservation, for example, as compost in the agricultural field. In this application use, there have been proposed various methods: for example, (a) a method of producing compost in which waste paper is treated by a dry-type fiber loosening machine such that fibers constituting the waste paper are loosened, to form cottony regenerated pulp; the cottony regenerated pulp is mixed with plants (fallen leaves or fallen twigs), and is suitably adjusted in its water content by the addition of water; and the resultant mixed pulp is fermented, thus producing compost (see the process diagram in FIG. 14), and (b) a method of using the above-described regenerated pulp as a manure absorbing material for absorbing fertilizer which has been excessively sprayed over orchard or lowland field.

The cottony regenerated pulp with fibers being dry-loosened has the following features (advantages and disadvantages):

(1) to repel water (hydrophobic), (2) to generate dust, and (3) to be small in specific gravity.

As compared with the wet-type fiber loosening process, the dry-type fiber loosening process has the following features:

(4) to form regenerated pulp containing long fibers, (5) to form regenerated pulp containing a large amount of powdery paper, (6) to form regenerated pulp in which non-loosened fibers remain in a large amount, and (7) to eliminate a waste water treatment equipment, to reduce installation cost, and to make compact the size of the apparatus.

These features become advantageous or disadvantageous in accordance with the above-described applicable field of regenerated pulp. For example, when the pulp is used as regenerated paper, the non-loosened fiber portion must be suppressed within 0.1% or less for making smooth the surface of the paper, so that the feature (6) becomes disadvantageous. On the contrary, when the pulp is used as compost, the non-loosened fiber portion enhances the manure holding property, so that the feature (6) rather becomes advantageous.

In the case of producing compost using the regenerated pulp, there occurs a problem in which because of the feature (1) to repel water, the regenerated pulp is separated from the supplied water and is thus difficult to absorb water. The regenerated pulp can absorb water by compressing it in water; however, in this case, it is difficult to uniformly adjust the water content in the produced compost, and the process takes a lot of labor, resulting in the lack of usability in terms of the practical use.

In the case where the regenerated pulp is sprayed as a manure holding material, for example in orchard, the pulp tends to be scattered by wind because of the feature (3) to be small in specific gravity. This is disadvantageous in reducing the amount of the pulp acting as the manure holding material, and further, it possibly causes dust pollution due to the dust of pulp.

In the case where the regenerated pulp is used as a seedling material for growing mushrooms by breeding of fungus such as growing of "Shiitake" (one kind of mushrooms), it possibly becomes the medium of bacteria depending on the past history of waste paper before regeneration. Consequently, the fiber-loosened pulp must be subjected to bactericidal processing before being used as a seedling material.

As described above, the dry-type fiber-loosened pulp has the advantages in terms of the dry type fiber-loosening process (for example, the features (6) and (7)), but in the application use to the agricultural field, it has problems to be solved, for example, in terms of the water absorbing ability, in generation of dust, and in addition of the bactericidal/disinfection process.

On the other hand, from the viewpoint of agricultural machines, there has been developed an apparatus for soft-swelling/breaking the texture (organ) of a vegetable fibrous material or animal fibrous material by a high temperature/high pressure processing (Unexamined Japanese Patent Publication No. SHO 52-1118). The soft-swelled/broken product has been used as a material for seedling culture and a feed for domestic animal and fowl. FIG. 15 is a vertical sectional view showing the construction of the apparatus of this type. In this figure, reference numeral 151 designates a main body of the apparatus; 152 is a screw; 153 is a material throwing port; 154 is a discharge opening portion; 155 is a cutter; and 156 is an enlarged diameter portion. In this apparatus, a screw blade portion 157 having a specified diameter is continuous to a taper screw blade portion 158 having a diameter gradually reduced in the direction of nearing the discharge portion side. The fibrous material is fed by rotation of the screw 152, and is simultaneously compressed, and thus the soft-swelled/broken product of the fibrous material is discharged from the discharge opening portion 154.

The apparatus performs the heating bactericidal processing while compressing the fibrous material, so that the above-described problem of the cottony regenerated pulp can be somewhat solved; however, this apparatus is intended to only perform the soft-swelling/breaking of the fiber texture (organ), and thereby it can soften the material but cannot solidify the produced material.

In the case where dry-type fiber-loosened cottony paper is used as a fibrous material, there occurs a problem that it is easily scattered by wind when being sprayed on soil because of its small specific gravity. In view of the application use in the agricultural mechanical field, it is desired to mold the fibrous material.

SUMMARY OF THE INVENTION

An object of the present invention is to provide a fibrous material molding apparatus capable of compressing and solidifying the fibrous material mainly containing waste paper which has been difficult to be applied to the agricultural field, and to obtain an excellent agricultural material using the apparatus.

According to one preferred mode of the present invention, there is provided an apparatus for molding a fibrous material mainly containing waste paper, in which a fibrous material mainly containing waste paper is thrown into a cylindrical cylinder from a raw material throwing port, being fed to the leading edge of the cylindrical casing by the feeding action of a rotary screw provided in the cylindrical casing, and discharged from the leading edge, the apparatus comprising: a molding/discharging member provided at the leading edge of the cylindrical casing for compressing the fibrous material fed to the leading edge of the casing into a specified shape and discharging the compressed fibrous material.

In this preferred mode of the present invention, waste paper thrown in a cylindrical casing is compressed by the feeding action of a rotary screw, and is molded and discharged. In this case, the screw pitch is preferably formed in such a manner as to be reduced continuously or stepwise in the direction of nearing the leading edge of the rotary screw, or the depth of the screw groove is preferably formed in such a manner as to be narrower continuously or stepwise in the direction of nearing the leading edge of the rotary screw. With this construction, the water content of a molded product can be further equalized. In the apparatus of the present invention, the front portion of the rotary screw shaft is rotabaly supported, so that the feeding, compression and molding/discharge of waste paper can be stably performed. Moreover, by provision of a cutting means outside the molding apparatus, it becomes possible to positively adjust the length of a molded/discharged product into a specified value, for example, into a pellet shape.

According to the present invention, a fibrous material mainly containing waste paper can be solidified through high temperature/high pressure process. The fibrous material molding apparatus of the present invention is suitable for fabricating agricultural materials, for example, a seedbed material for rice crop, a seedling material for growing mushrooms, a manure absorbing/holding material and a compost material.

BRIEF DESCRIPTION OF THE DRAWINGS

FIGS. 1A and 1B are views showing a molding apparatus including a molding die having a plurality of discharge holes according to the present invention, wherein FIG. 1A is a side view; and FIG. 1B is a front view;

FIGS. 2A and 2B are views showing a molding apparatus including unequal pitch rotary screw according to the present invention; wherein FIG. 2A is a left side view; and FIG. 2B is a front view;

FIGS. 3A and 3B are views showing a molding apparatus including a rotary screw of an equal pitch and an uneven groove depth according to the present invention, wherein FIG. 3A is a left side view; and. FIG. 3B is a front view;

FIGS. 4A, 4B and 4C are views showing a molding apparatus internally including a cutter according to the present invention, wherein FIG. 4A is a left side view; FIG. 4B is a front view; and FIG. 4C is a schematic view for illustrating the shape of the cutter;

FIGS. 5A and 5B are views showing a molding apparatus including a plurality of discharge holes each having the diameter ranging from 10 to 40% of that of a rotary screw, wherein FIG. 5A is a left side view; and FIG. 5B is a front view;

FIGS. 6A and 6B are views showing a molding apparatus including a molding die separated from the leading edge of a rotary screw according to the present invention, wherein FIG. 6A is a left side view; and FIG. 6B is a front view;

FIGS. 7A and 7B are views showing a molding apparatus having a restricting structure in which the cross-section of a cylindrical casing is reduced according to the present invention, wherein FIG. 7A is a left side view; and FIG. 7B is a front view;

FIGS. 8A and 8E are views showing a molding apparatus having a plurality of grooves on the inner surface a cylindrical casing according to the present invention, wherein FIG. 8A is a front view; FIGS. 8C to 8E are sectional view taken along line A—A of FIG. 1A;

FIGS. 9A and 9B are views showing a molding apparatus having a liquid injection means in the barrel wall of a raw material throwing port according to the present invention, wherein FIG. 9A is a left side view; and FIG. 9B is a front view;

FIGS. 10A and 10B are views showing a molding apparatus having a liquid injection means in the barrel wall of a cylindrical casing according to the present invention, wherein FIG. 10A is a left side view; and FIG. 10B is a front view;

FIGS. 11A, 11B and 11C showing a molding apparatus having a plurality of raw material throwing ports according to the present invention, wherein FIG. 11A is a left side view; FIG. 11B is a front view; and FIG. 11C is a plan view;

FIGS. 12A and 12B are views showing a molding apparatus including an electric motor according to the present invention, wherein FIG. 12A is a left side view; and FIG. 12B is a front view;

FIGS. 13A and 13B are views showing a molding apparatus including a cutter inside the apparatus according to the present invention, wherein FIG. 13A is a left side view; and FIG. 13B is a front view;

DETAILED DESCRIPTION OF THE PREFERRED EMBODIMENTS

Figure 3A:
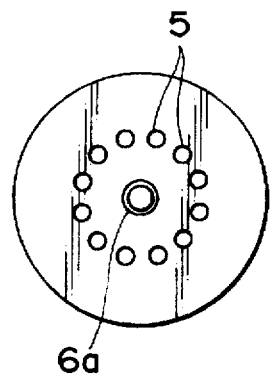

Hereinafter, the preferred embodiments of the present invention will be described with reference to the drawings.

FIGS. 1A and 1B are views showing the basic construction of a molding apparatus for molding a fibrous material according to the present invention. In the construction shown in these figures, a fibrous material thrown in a cylindrical casing 2 from a raw material throwing port 1 is fed to the leading edge of the cylindrical casing 2 by the feeding action of an equal pitch rotary screw 3, and is discharged from the leading edge. This apparatus further includes a molding/discharging member 6 at the leading edge of the cylindrical casing 2 for compressing the fibrous material fed thereto and discharging it in a specified shape, and a screw supporting member 6a at the molding/discharging member 6 for rotatably supporting the leading edge of the equal pitch rotary screw 3.

The molding/discharging member 6 is composed of a molding die having a plurality of discharge holes 5 arranged in a circular shape. Reference numeral 4 designates a drive shaft connected to a rear portion of a rotational shaft of the rotary screw 3. The rear portion of a rotational shaft is rotatably supported by a bearing 7. It is noted that in this apparatus, the screw supporting member 6a is provided on the molding/discharging member 6; however, it is not limited thereto.

Next, the operation of the apparatus having the above-described construction will be descried.

① First, a fibrous material mainly containing waste paper is thrown from the raw material throwing port 1. The examples of the thrown waste paper may include newspaper, telephone directory, magazine or OA paper sheet which have been conventionally difficult to be compressed and molded. The waste paper may be singly molded, and may be molded together with other fibrous materials, as needed. The examples of the fibrous materials other than waste paper may include vegetable fibrous material such as sawdust, bagasse, bark, wooden chip, chaff, fallen leaf, fallen twig, trimmed twig or wheat straw; and an animal fibrous material such as woolen refuse, hair, feather, or skin refuse.

These fibrous materials are desired to be finely cut. For example, in the case where waste paper is thrown, it is desirable that the waste paper is previously cut in a strip shape by a paper-shredder and is supplied to a dry fiber-loosening apparatus, to be thus fiber-loosened in a cottony shape (hereinafter, the dry-type fiber-loosened waste paper in a cottony shape is referred to as "cottony paper"). The cutter is not limited to the paper-shredder. For example, waste paper may be manually cut and be directly thrown as it is. The dry-fiber loosening apparatus may include a type described in Unexamined Japanese Patent Publication No. HEI 5-265895.

The cottony paper has useful properties for fertilization, for example, it is rich in fiber; excellent in water absorption and permeability; and high in water holding property, heat retaining property, manure absorbing force and manure holding force. Accordingly, the waste paper compressed/molded becomes a very good agricultural material.

The fibrous material to be thrown in the apparatus of the present invention is required to suitably contain water content for making smooth the compression. For example, the fibrous material containing water content by itself is not required to be added with water newly; however, in the case where the cottony paper not containing water must be added with water in a suitable amount. The materials thrown in the apparatus of the present invention together with waste paper are dependent on the application use of the molded product finally obtained, that is, the kinds of the agricultural material. Hereinafter, example of such materials will be described.

In the case where the molded product of the fibrous material is applied to a seedling material used for rice crop, cottony paper, soil and/or compost may be mixed and thrown in the apparatus of the present invention. By addition of soil to cottony paper having a small specific gravity, it becomes possible to suitably increase the weight, and to prevent the scattering of the seedling material. By addition of compost, it becomes possible to supply nutritive substance, and hence to accelerate the growing of roots of crops by the property of the compost (fertilizing the soil and suppressing the function of harmful object). The compost is not particularly limited, and may include wheat straw, and fallen leaves. The seedling material thus produced contains long fibers, which makes difficult the hardening of soil, and does not obstruct the growing of roots of crops; accordingly, the crop rich in nutritive value can be obtained.

In the molded/discharged product of the fibrous material is used for a manure absorbing/holding material, cottony paper, water and/or manure may be mixed and thrown in the apparatus of the present invention. Since water is added with cottony paper having a small specific gravity in an amount of about 20%, which eliminate the fear that the cottony paper is scattered by wind. To further enhance the manure absorbing ability, manure may be added to the cottony paper. Thus, the nutritive substance in a necessary amount can be supplied to crops when needed by the effect of the manure holding ability of the cottony paper even for the soil and seedling having little nutritive substance. To increase the weight of cottony paper and to increase the manure holding ability, it is further desirable to add both of water and manure to cottony paper. Moreover, by molding and solidifying the manure absorbing/holding material in a mat or sheet shape, there can be eliminated the fear that it is scattered by wind, and further, it can be mechanized, thus reducing the labor for carrying and spraying.

In the case where the molded product of the fibrous material is used for compost, cottony paper may be mixed with underwater living or the remains thereof. The underwater living is not particularly limited, and may include indigo plant group, crimson plant group, brown plant group, and green plant group, for example, green alga such as seaweed, "Sugamo", or Zostera. Among these, green alga is most preferable. The green alga is a plant which has not leaf, and breeds by globule or division. The underwater animal may includes fishes. The remains of the water living may includes sludge, and plankton. Heads and tails of fishes are preferable.

The cottony paper, may be mixed with bodies, excrement of land livings, or dead livings. The land living is not particularly limited, and may include heating-organic matters (having a property of increasing the temperature of a human organism eating it, which includes the plants such as fallen leaves of bushes, broad leaf trees; and excrement of animal such as dung of horses and domestic fowls), and cooling organic-matters (having a property of decreasing the temperature of a human-organism eating it, which includes wild grass or vegetables having no cavity at the center of the stalk and hilt such as runner of sweet potato, indigo ball, leaves of radish and carrot; and excrement of animal such as dung of cattles. Moreover, the dead body of the land livings (for example, fallen leaves or fallen twigs) may be used.

In the case of obtaining the above compost, the compost may be added with nitrogen as the nutritive root of bacteria, for example, organic nitrogen fertilizer such as ammonium sulfate, rice bran, and yeast fungus. Such compost contains a large amount of long fibers, which prevents the hardening of soil and does not obstruct the growing of crops, so that it sufficiently absorbs the energy sources necessary for growing the crops such as phosphoric acid contained in soil. As a result, it is effective to grow good crops.

② The fibrous material thrown in the raw material throwing port 1 is fed to the leading edge of the cylindrical casing by the feeding action of the equal pitch rotary screw 3 in the cylindrical casing 2, being compressed, and is molded/discharged in a specified shape from the discharge hole 5.

Specifically, the fibrous material first enters gaps between the cylindrical casing 2 and the equal pitch rotary screw 3. In the case where the equal pitch rotary screw has a spiral shape threaded clockwise, when the screw is rotated counterclockwise as seen from the leading edge side of the cylindrical casing, the thrown fibrous material is gradually shifted toward the leading edge of the cylindrical casing. When the fibrous material reaches the leading edge of the cylindrical casing, part of the fibrous material is discharged from the discharge holes 5 formed on the molding die to the outside of the apparatus. However, as shown in the figures, the diameter of the discharge hole is generally small in terms of the formation of a back pressure, and the flow resistance of the fibrous material passing through the discharge holes 5 is large. Accordingly, most of the fibrous material receives the axial feeding pressure by the subsequent fibrous material sequentially carried by the feeding action of the equal pitch rotary screw 3. As a result, the fibrous material is strongly compressed as a whole, and thereby water forcibly permeates between fibers of the fibrous material. For example, in the case where cottony paper and vegetative fibrous material are thrown in the apparatus of the present invention, the texture of the vegetable fibrous material is broken upon compression, and a large amount of water contained in the vegetable fibrous material is absorbed in the cottony paper, thus equalizing the water content of the whole fibrous material. At this time, part of pressing energy is converted into thermal energy, which is effective to heat the fibrous material.

The fibrous material having the water content equalized through such a high pressure/high temperature process, is discharged from the discharge holes 5. At this time, as described above, the fibrous material is applied with a very strong compression force, and is started to be solidified. Accordingly, the fibrous material discharged from the discharge holes 5 is molded in a solid product having a sectional shape substantially equal to that of the discharge hole 5. Alternately, for some kind of the fibrous material, it is discharged in such a manner as to be cut-off in a pellet shape by the dead weight.

In the above compression process, there is a fear that the screw shaft is applied with a large force leading to vibration. However, since the molding/discharging member 6 is provided at the leading edge of the cylindrical casing 2 and the screw supporting member 6a for rotatably supporting the leading edge of the equal pitch rotary screw 3, the present invention has effects of ① stably performing the molding/ discharging operation, ② increasing the rotational number of the screw, and ③ enhancing the processed amount of the fibrous material.

The fibrous material thus molded/discharged contain the uniform water content and can be sterilized by the heat generated upon compression of the fibrous material. In the case where cottony paper is used as the fibrous material, the cottony paper sufficiently absorbs water, and is effective to prevent the generation of duct.

Using the apparatus having the construction shown in FIGS. 1A and 1B, it becomes possible to solve the problems in terms of the hydrophobic property, in generation of dust, and in requiring the additional process for sterilization, which have been caused in using the prior art dry-type fiber-loosened pulp.

FIGS. 2A and 2B show an apparatus intended to adjust the feed speed of the screw, and which includes a rotary screw having a screw pitch continuously or stepwise reduced in the direction of nearing the leading edge of the rotary screw.

In this apparatus, since the equal pitch rotary screw 3 shown in FIGS. 1A and 1B is replaced by an unequal pitch rotary screw having the pitch reduced in the direction of nearing the leading edge, a space per one pitch formed between the screw and the cylindrical casing is reduced in the direction of carrying the fibrous material, and thereby the feed speed of the rotary screw is reduced. As a result, the fibrous material is slowly compressed and heated. This makes it possible to equalize the water content of the molded/discharged product for a sufficient period of time. The apparatus having such a construction is particularly effective for processing of a vegetative fibrous material.

Figure 3B:
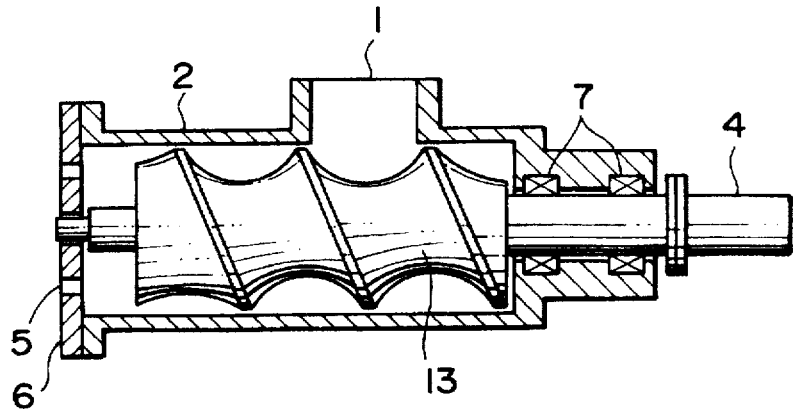

An apparatus shown in FIGS. 3A and 3B is intended to adjust the feed speed of the screw. This apparatus includes an equal pitch rotary screw 13 in which the depth of the screw groove is narrower continuously or stepwise in the direction of nearing the leading edge of the rotary screw (the depth of the screw groove is uneven and the screw pitch is equal).

In this apparatus, the depth of the screw groove is made gradually narrower, and thereby a space per one pitch formed between the screw and the cylindrical casing is reduced, so that cottony paper is slowly compressed and heated, and it gradually absorbs water. The above-described slow compressing action makes it possible to further equalize the water content of the molded/discharged product compared with the apparatus using the equal pitch rotary screw.

Figure 4A:
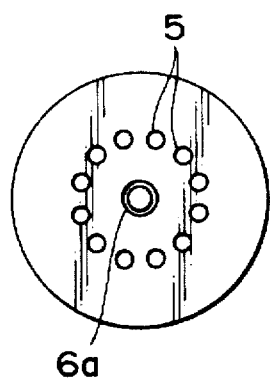
Figure 4B:
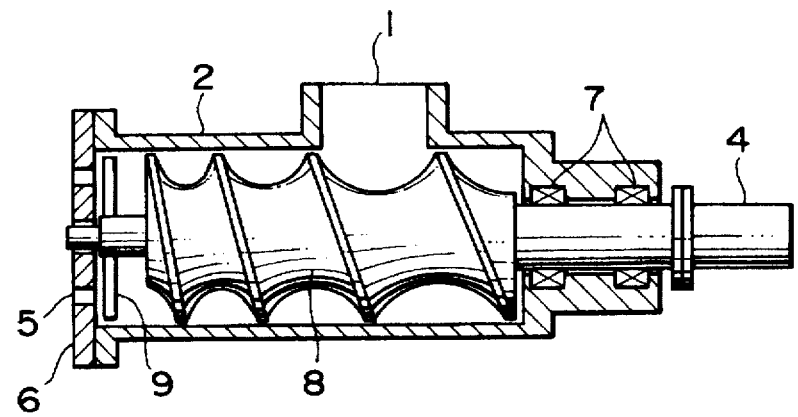
Figure 4C:
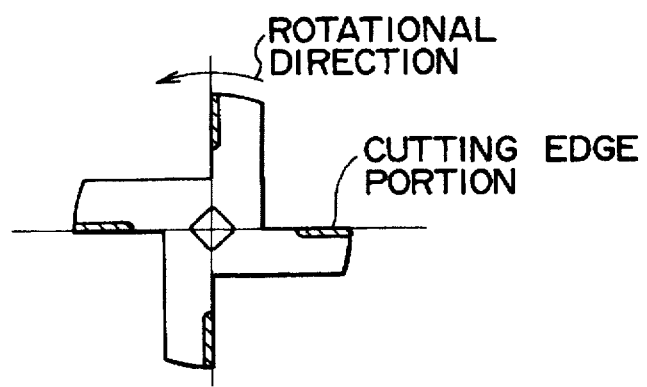

An apparatus shown in FIGS. 4A, 4B and 4C includes a cutter 9 rotatably in synchronization with the unequal pitch rotary screw 8, which is provided directly before the molding die within the cylindrical casing. In addition, FIG. 4C shows the shape of the cutter.

In the case where trimmed twigs, leaves with twigs, bark, and the like are used as a fibrous material, since the material is quite rigid, the organs of plants, often, cannot be sufficiently broken only by the compression using the above rotary screw. The apparatus having the above construction is very effective to compress such a material. Specifically, by provision of the cutter 9 in the apparatus, it becomes possible to sufficiently break the organs of plants (for example, blade and vein) as well as twigs with leaves, and hence to squeeze water therefrom. In the case of using the above material, there is a fear in blocking the discharge holes. However, in this apparatus, since twigs and the like can be cut and broken by the cutter 9, the generation of blocking can be prevented. Additionally, by provision of the cutter 9, the molded/discharged product can be adjusted in a pellet shape.

Figure 5A:
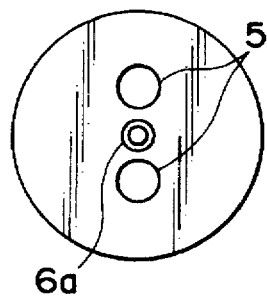
Figure 5B:
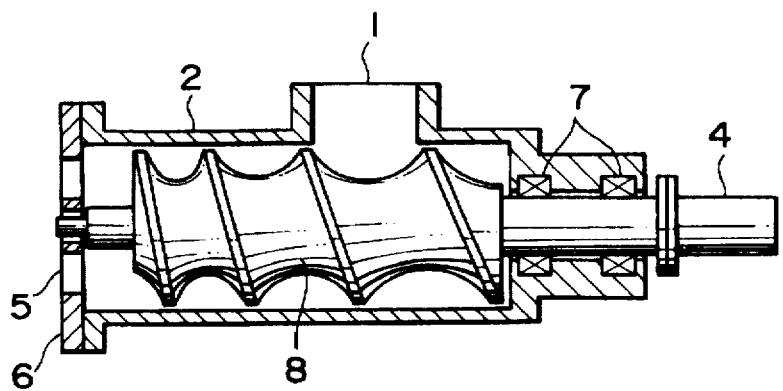

FIGS. 5A and 5B show an apparatus in which the diameter of a discharge hole 5 formed on a molding die is specified to be in the range of from 10 to 40% of the diameter of an unequal pitch rotary screw 8.

By increasing the diameter of the discharge hole 5, and preferably by setting the number of the discharge holes 5 to be about two, the diameter of the molded/discharged product can be increased. Accordingly, the apparatus having the above construction is suitable for fabricating a seedling material for growing mushrooms which requires a relatively longer product. The advantages of this apparatus are as follows: (1) to obtain the sterilizing effect, (2) to be excellent in permeability, (3) to effectively adjust the water content suitable for the growing mushrooms such as "Shiitake", (4) to provide a seedling being lower in weight than the conventional one leading to the reduction of labor. In addition, when the diameter of the discharge is more than 40%, the area of the mounting portion of the molding die becomes narrower, which is disadvantageous in restricting the mounting to the screw supporting member 6a. On the other hand, when the diameter of the discharge hole is less than 10%, the molded/discharged product is made smaller to the extent insufficient to be used as a seedling material for growing mushrooms.

Figure 6A:
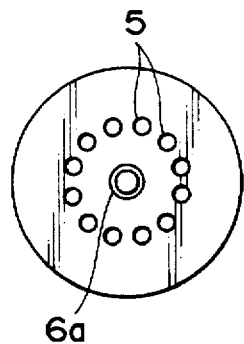
Figure 6B:
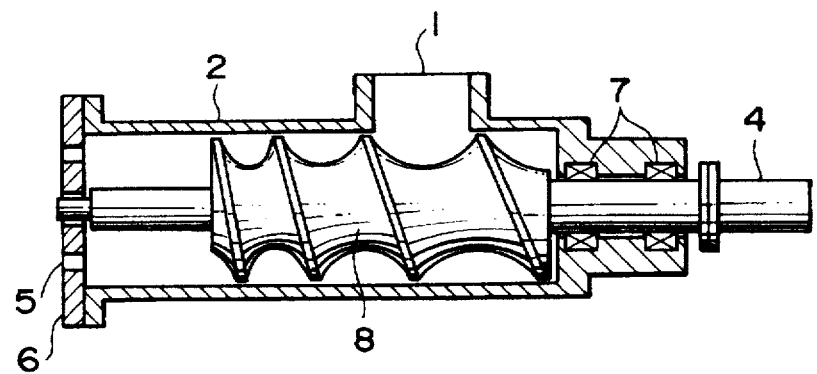

FIGS. 6A and 6B show an apparatus in which a molding die is separated from the leading edge of a rotary screw and a cavity is formed at the leading edge of a cylindrical casing.

As shown in these figures, the leading edge of the unequal pitch rotary screw 8 is cut along the plane perpendicular to the rotational shaft, that is, a plane portion is formed at the leading edge (molding die) of the cylindrical casing. If a cavity between the leading edge of the rotary screw and the molding die is narrow, the plane portion thus formed acts to cover the discharge holes 5 formed on the molding die, and since the rotary screw rotatably supported by the molding die is usually rotated, all of the discharge holes 5 are blocked. Namely, a molded/discharged product cannot be equally taken from all of the discharge holes.

However, in the apparatus having the above-described construction, a wide cavity can be formed between the leading edge of the unequal pitch rotary screw 8 and the molding die, the leading edge of the screw does not act as the cover as described above. Thus, the fibrous material reaching the leading edge of the unequal pitch rotary screw is once stored in the wide cavity, and then equally discharged through the discharge holes by the feeding action of the rotary screw.

Figure 7A:
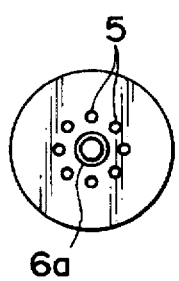
Figure 7B:
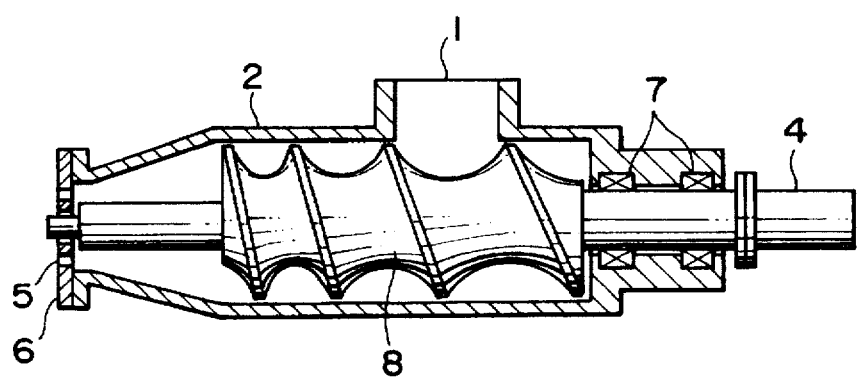

FIGS. 7A and 7B show an apparatus having a restricting structure in which the cross-section of the cylindrical casing is reduced in the direction of nearing the leading edge of the cylindrical casing.

With this apparatus, since the axial resistance is further increased, the compressing effect is further enhanced, as a result of which the water content of the molded/discharged product can be further equalized.

Figure 8A:
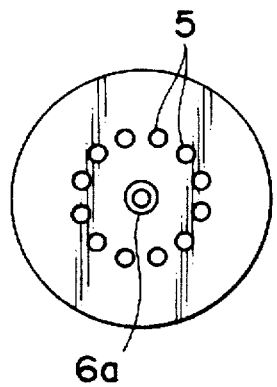
Figure 8B:
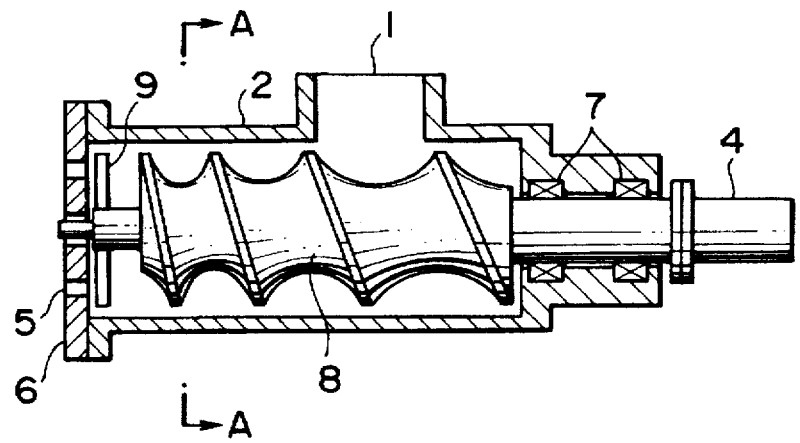
FIG. 8B is a front view.
Figure 8C:
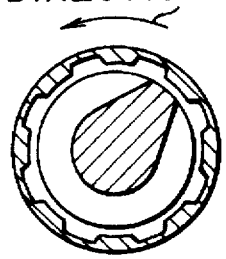
Figure 8D:
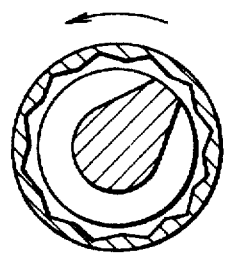
Figure 8E:
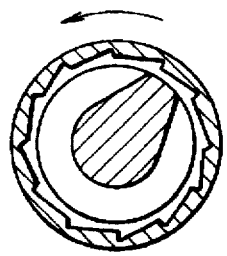
Figure 9A:
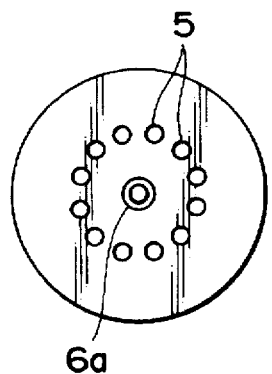
Figure 9B:
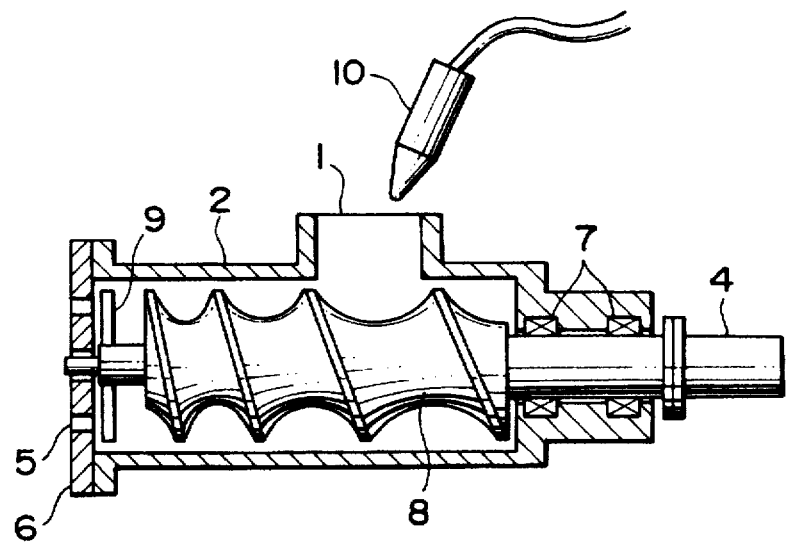
Figure 10A:
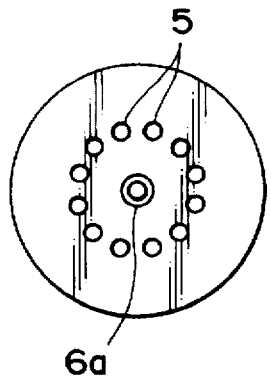
Figure 10B:
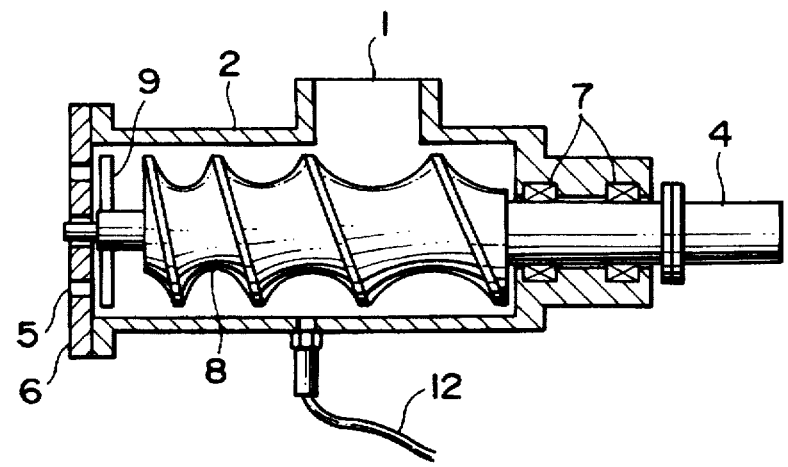

FIGS. 8A to 8E show an apparatus in which a plurality of linear grooves extend parallel to the rotational shaft of a rotary screw. In addition, FIGS. 8C, 8D and 8E are sectional views taken along line A—A of FIG. 8A, wherein FIG. 8C shows the projecting/recessed shape of the groove; FIG. 8D shows the toothed shape of the groove; and FIG. 8E shows the seesaw shape of the groove.

In the case where the apparatus of the present invention has no groove on the inner surface of the cylindrical casing, a large frictional resistance is generated between the fibrous material and the cylindrical casing upon carrying the fibrous material, so that a large power is required to be imparted to the rotational shaft. However, by provision of the grooves on the inner surface of the cylindrical casing, a cavity is created between the material and the cylindrical casing, so that the axial resistance is reduced and the power is thus reduced. Moreover, the space gives a resistance to the fibrous material in the rotational direction, and is effective to prevent slip. As a result, the fibrous material can be positively carried in the direction of the leading edge of the casing, and the fibrous material supplied in the raw material throwing port is slowly carried and compressed, thus making it possible to process a large amount of the fibrous material.

FIGS. 9A and 9B, and 10A and 10B show an apparatus in which a liquid injection means 10 is provided at the raw material throwing port or the barrel wall of the casing. In these figures, reference numeral 12 designates a nozzle. The injected liquid may include water, and a sticker such as starch glue. The liquid injection means is not particularly limited and may include a nozzle.

Upon carrying the fibrous material, by supply of water as described above, the sliding of the fibrous material can be enhanced. Moreover, by supply of a sticker such as starch glue, the starch glue is mixed with the fibrous material. In this case, the starch glue is sufficiently permeated by the compression action through rotation of the screw and the resistance of the molding die, and thereby the fibers of the fibrous material can be strongly bonded to each other, thus making it possible to obtain a hard molded/discharged product having a shape similar to the cross-section of the discharge hole.

The liquid injection means may be provided at the barrel wall of the raw material throwing port 1 or at the barrel wall of the cylindrical casing 2. However, the liquid injection means 10 is preferably provided at the barrel wall of the cylindrical casing under the consideration of the following facts: ① in the case where water is supplied from the raw material throwing port 1 together with cottony paper, the cottony paper having the hydrophobic property repels water, and is difficult to be quickly mixed with water, and ② in the case where a nozzle is provided on the raw material throwing port 1, the port is narrowed which leads to the reduction in the throwing amount of the fibrous material. By provision of the liquid injection means in the barrel wall of the cylindrical casing 2, it becomes possible to effectively mix the cottony paper with water without any reduction in the area of the raw material throwing port 1.

With the apparatus having the above construction, the solidification of a molded/discharged product further proceeds, which further makes easy the handling, and further promotes the mechanization of agricultural works. Moreover, since the fibers of the fibrous material are strongly bonded with each other by use of a sticker, in the case of cottony paper, the generation of dust is eliminated, thus preventing the dust pollution.

Figure 11A:
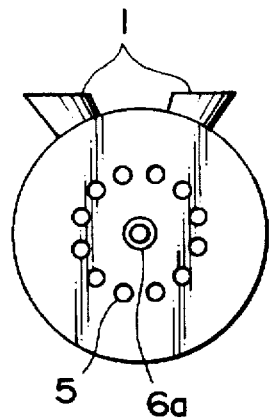
Figure 11B:
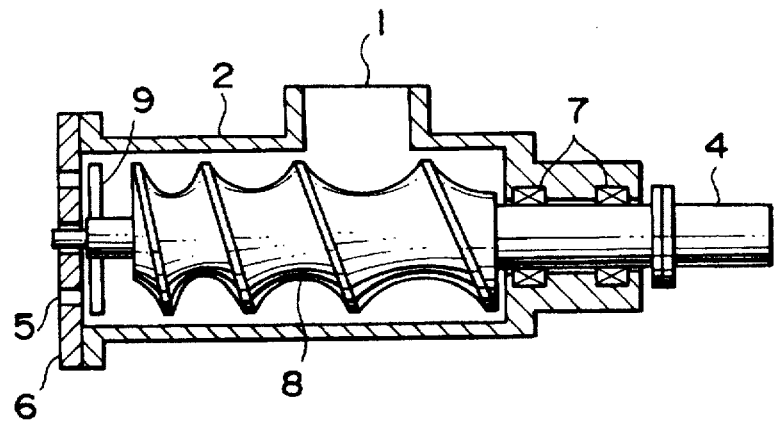
Figure 11C:
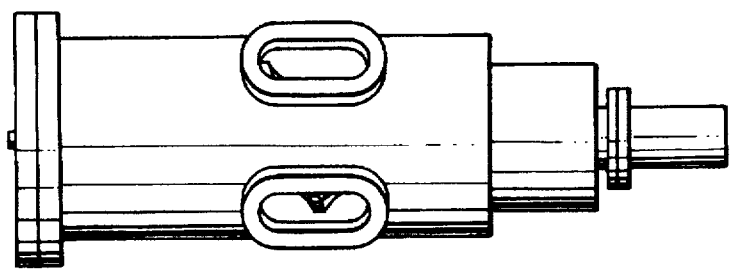
Figure 14:
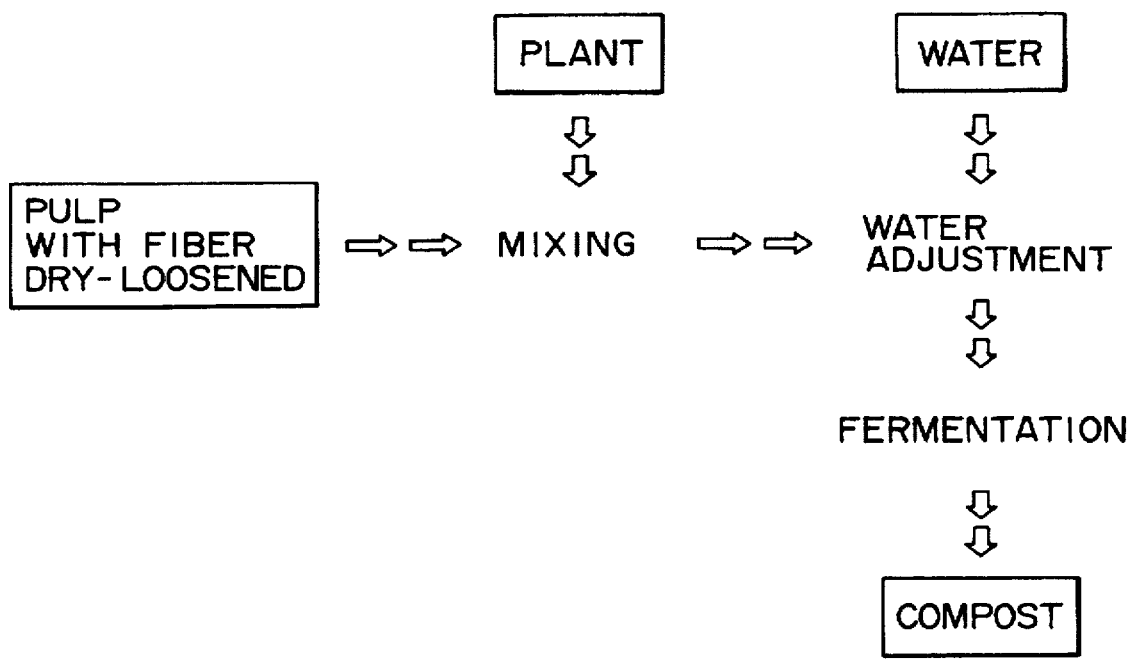
FIG. 14 is a process diagram showing the process of fabricating manure using a dry-type fiber-loosened pulp.
Figure 15:
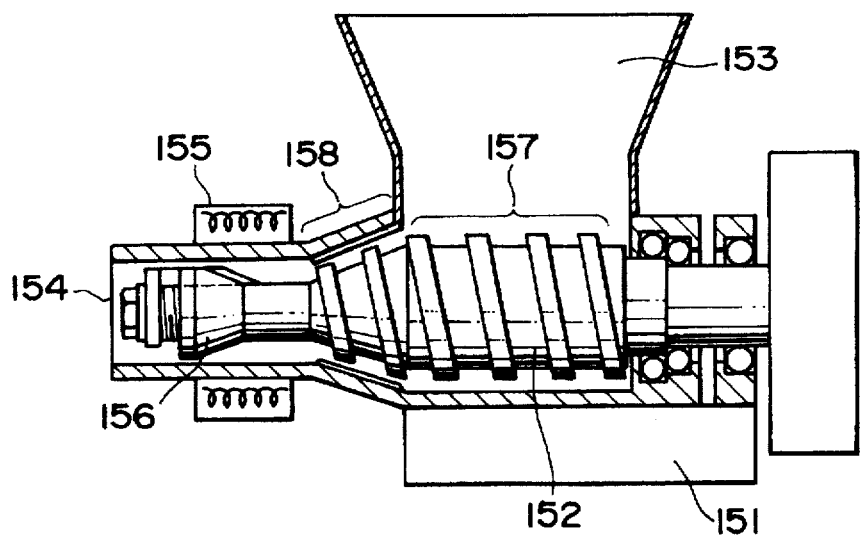
FIG. 15 is a sectional view of a prior art soft-swelling apparatus.

The molding apparatus shown in FIGS. 11A, 11B and 11C has two raw material throwing ports. In addition, FIG. 11C is a plan view of a molding apparatus.

By provision of a plurality of raw material throwing ports 1, the area of the material contacted with the equal pitch rotary screw is widen upon throwing the fibrous material, which makes it possible to throw a large amount of the fibrous material. Moreover, even when different materials of two kinds or more (for example, cottony paper and trimmed twig) can be thrown in the apparatus from a plurality of the raw material throwing ports, resulting in the enhanced workability.

FIGS. 12A and 12B show a molding apparatus in which an electric motor 11 is connected to a drive shaft. The electric motor may be replaced by a gasoline engine or water turbine.

In the molding apparatus of the present invention, a suitable drive force can be used in accordance with the processed amount of the fibrous material and the installed location of the apparatus. For example, in the case where the throwing amount of the fibrous material is very small, the drive force is sufficiently obtained manually. On the other hand, in the case where the throwing amount is large, the above-described drive force can be used, which improves the handling of the apparatus and reduces the processing cost.

FIGS. 13A and 13B show a molding apparatus including a cutter 9 as cutting means outside the leading edge of the molding apparatus. By provision of the cutter 9 outside the apparatus, the fibrous material molded/discharged from the leading edge of the cylindrical casing can be continuously cut into pellets. Even when the cutter 9 is not provided outside the apparatus, the fibrous material can be cut into pellets by the dead weight, or by provision of the cutter inside the apparatus as shown in FIGS. 4A and 4B of the molded/discharged product. However, by provision of the cutter 9, the fibrous material can be positively and accurately cut in pellets, and further, the pellet having the desired length can be obtained by suitably selecting the speed of the cutter.

The examples of the shape of the molded/discharged product may include a mat shape and sheet shape, other than the pellet shape. These shapes can be easily obtained by connecting the molding apparatus to a mat forming machine or a sheet forming machine.

Each of the mat forming and the sheet forming machines is not particularly limited, and may include a general type in which the molded product discharged from the molding apparatus is carried by a conveyor and is formed in a mat shape or a sheet shape by pressing rolls. The mat or sheet like product is very excellent in the handling, and is easy in its mechanization. It is prevented from being scattered when being mixed with soil.

The animal fibrous material described above can be of course used in the molding apparatus of this type.

While the preferred embodiments of the present invention have been described, such description is for illustrative purpose only, and it is to be understood that changes and variations may be made without departing from the spirit or scope of the following claims.

What is claimed is:

1. An apparatus for molding a fibrous material mainly containing waste paper, comprising:

a cylindrical casing having an inner surface, a raw material throwing port and a leading edge;

a rotary screw provided on a rotational shaft in said cylindrical casing for feeding fibrous raw material to be discharged from said leading edge;

a molding/discharging member provided at the leading edge of said cylindrical casing for compressing said fibrous material fed to the leading edge of said casing into a specified shape and discharging said compressed fibrous material, said molding/discharging member comprising a molding die having at least one discharge hole, wherein the diameter of said at least one discharge hole is from 10 to 40% of the diameter of said rotary screw.

2. An apparatus for molding a fibrous material according to claim 1, wherein said molding/discharging member is provided with a supporting mechanism for rotatably supporting a leading edge of said rotary screw.

3. An apparatus for molding a fibrous material according to claim 2, wherein said rotary screw is formed such that a screw pitch thereof becomes smaller continuously or stepwise in the direction approaching the leading edge of said rotary screw.

4. An apparatus for molding a fibrous material according to claim 2, wherein said rotary screw is formed such that a groove depth of said screw becomes narrower continuously or stepwise in the direction approaching the leading edge of said rotary screw.

5. An apparatus for molding a fibrous material according to claim 1 or 2, wherein a liquid injection mean is provided at said raw material throwing port or a barrel wall of said cylindrical casing.

6. An apparatus for molding a fibrous material according to claim 1 or 2, wherein a cutter rotatable in synchronization with said rotary screw is provided directly before said molding/discharging member within said cylindrical casing.

7. An apparatus for molding a fibrous material according to claim 1 or 2, wherein a cutting means is provided outside the leading edge of said casing for cutting said fibrous material molded and discharged.

8. The apparatus of claim 1 wherein the inner surface of said cylindrical casing is formed with a plurality of linear grooves extending parallel to the rotational shaft of said rotary screw.

9. An apparatus for molding a fibrous material mainly containing waste paper, comprising:

a cylindrical casing having an inner surface, a raw material throwing port and a leading edge;

a rotary screw provided on a rotational shaft in said cylindrical casing for feeding fibrous raw material to be discharged from said leading edge;

a molding/discharging member provided at the leading edge of said cylindrical casing for compressing said fibrous material fed to the leading edge of said casing into a specified shape and discharging said compressed fibrous material, said rotational shaft being rotationally supported at said leading edge, wherein the cross-section of said cylindrical casing adjacent said leading edge becomes smaller in the direction approaching said leading edge to define a restricting structure, and wherein said rotary screw does not extend into said restricting structure, thereby defining a cavity in said restricting structure between said leading edge and said rotary screw, and wherein said molding/discharging member comprises a molding die having at least one discharge hole and the diameter of said at least one discharged hole is from 10 to 40% of the diameter of said rotary screw.

10. The apparatus of claim 9 wherein the inner surface of said cylindrical casing is formed with a plurality of linear grooves extending parallel to the rotational shaft of said rotary screw.

* * * * *